July 3, 1956     A. SHEA     2,753,153
AUTO JACK
Filed Sept. 30, 1953     2 Sheets-Sheet 1
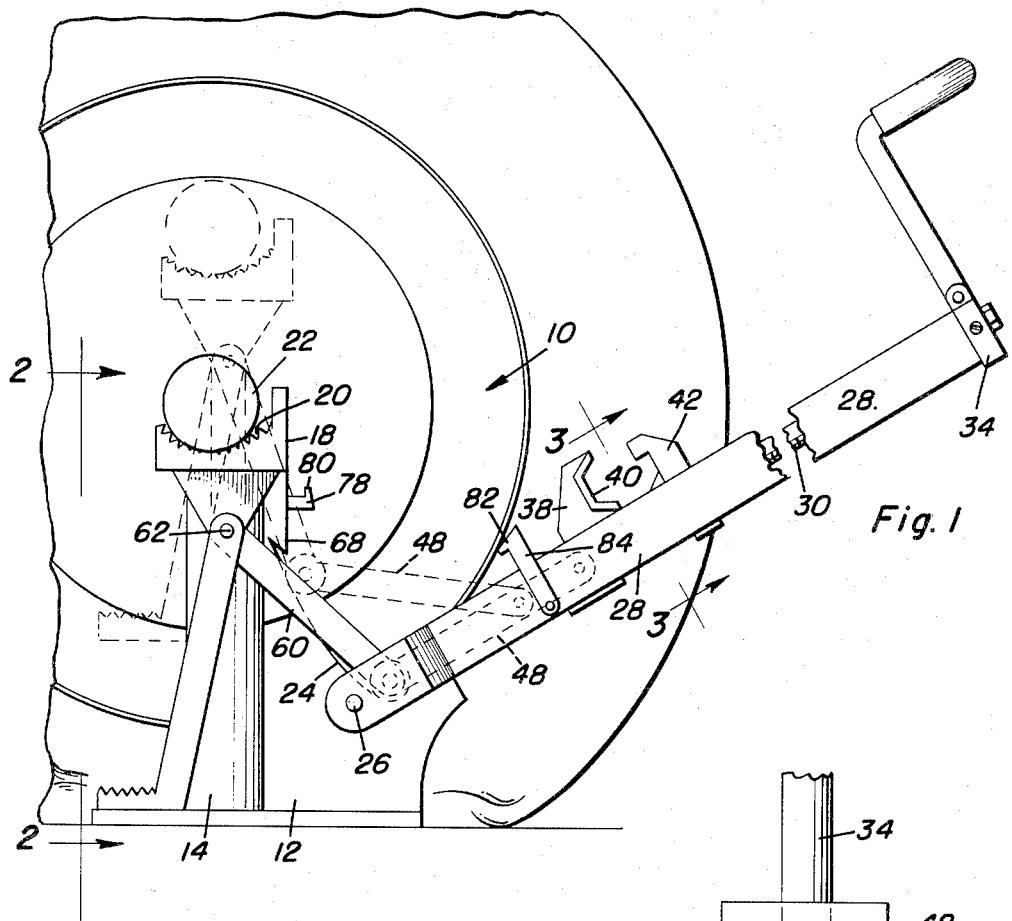
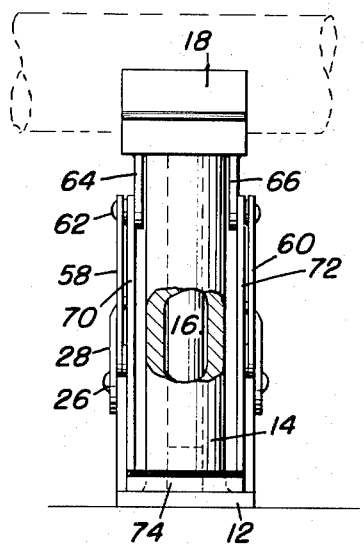
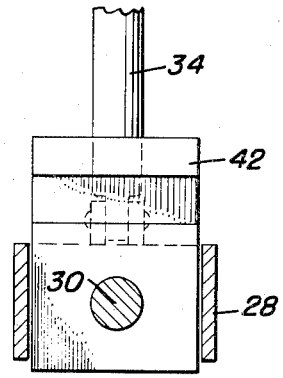
Arthur Shea
INVENTOR.

July 3, 1956
A. SHEA
2,753,153
AUTO JACK
Filed Sept. 30, 1953
2 Sheets—Sheet 2
Fig. 4
Fig. 5
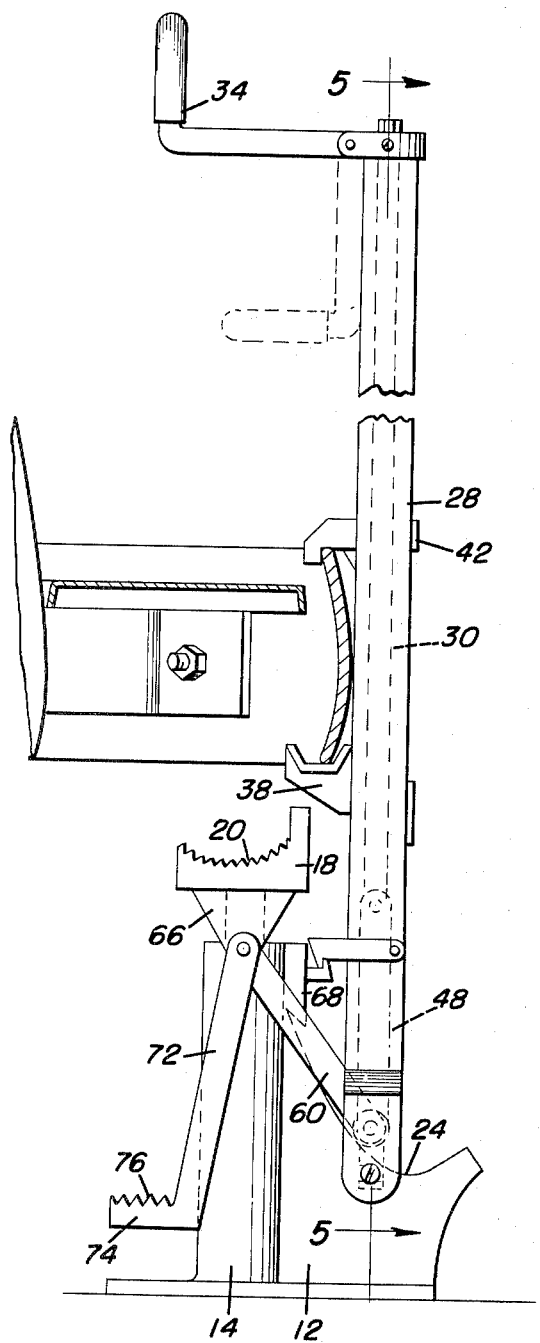
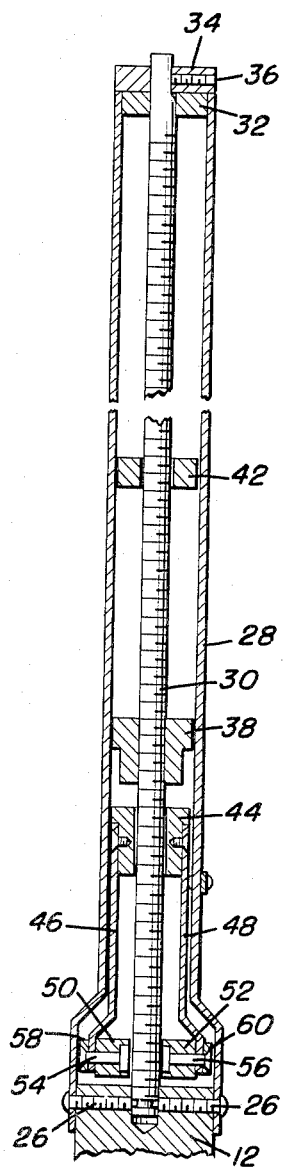
Arthur Shea
INVENTOR.
BY *Clarence A. O'Brien*
*and Harvey B. Jacobson*
Attorneys

2,753,153

AUTO JACK

Arthur Shea, Aurora, Ill.

Application September 30, 1953, Serial No. 383,337

2 Claims. (Cl. 254—100)

This invention relates to lifting devices and more particularly to a combination automobile jack especially adapted for selective use of an axle engaging lift member or of a bumper engaging lift block.

The primary object of this invention resides in the provision of a combination automobile jack which may be utilized alternatively either as a bumper jack or as an axle jack.

The construction of this invention features a base having pivotally attached thereto a suitable elongated member providing means for rotatably mounting a lift screw. The screw is utilized to alternatively actuate an axle engaging lift member or a bumper engaging lift block so as to raise a portion of an automobile or like vehicle for such purpose as may be necessary.

Featured in this invention is a base having a cam surface thereon which is engaged by a roller carried by linkage connected to a block threadedly engaged with the lift screw. Hence, upon rotation of the lift screw, the roller will ride upon the cam surface to thus raise or lower the axle engaging lift member.

There is also pivotally attached to the axle engaging lift block a toe lift which adds to the versatility of this device. The various elements of the invention may be collapsed to occupy a comparatively small space, and the combination jack is no bulkier than conventional jacks. In addition to the axle engaging lift member, there is threadedly mounted on the lift screw a bumper engaging lift block. When the bumper engaging lift block is utilized, there are employed means for lockingly holding the lift screw in a substantially vertical position.

Still further objects and features of this invention reside in the provision of a combination auto jack that is strong and durable, comparatively simple in construction and manufacture, of a wide range of utility so as to enable the jack to be utilized in conjunction with all makes and models of various existing vehicles, and which bumper jack is relatively inexpensive to produce.

These, together with the various ancillary objects and features of the invention which will become apparent as the following description proceeds, are attained by this combination auto jack, a preferred embodiment of which has been illustrated in the accompanying drawings, by way of example only, wherein:

Figure 1 is a side elevational view of the combination auto jack comprising the present invention;

Figure 2 is a vertical sectional view as taken along the plane of line 2—2 in Figure 1 illustrating the construction of the lift member adapted to engage the axle of an automobile and its associated parts;

Figure 3 is a sectional detail view as taken along the plane of line 3—3 of Figure 1 and illustrating the relative relationship of the lift screw and guide block;

Figure 4 is a side elevational view of the combination auto jack shown in a position for use in engaging the bumper of a vehicle; and Figure 5 is a vertical sectional view as taken along the plane of line 5—5 of Figure 4 illustrating in detail the construction of the lift screw.

With continuing reference to the accompanying drawings, wherein like reference numerals designate similar parts throughout the various views, reference numeral 10 generally designates the combination automobile jack comprising the present invention. This automobile jack 10 includes a base 12 having a hollow tubular portion 14 within which the shaft 16 of an axle engaging lift member 18 is slidably mounted. The axle engaging lift member 18 is provided with an arcuate toothed upper portion 20 for enabling the lift member 18 to properly seat an axle, such as indicated at 22 of a vehicle when it is desired to raise a portion of the vehicle.

The base 12 is further provided with an arcuate cam surface 24 and has pivotally attached thereto by means of a pin, bolt, or rivet, as indicated at 26, an elongated member 28. The elongated member 28 may be formed from a length of channel iron or may be constructed from a composite assembly utilizing two side straps. As can be seen best in Figure 5, an optional arrangement of parts for pivotally securing the member 28 to the base 12 includes a pair of screws 26 which while being threadedly engaged in the base 12 provide a bearing support for a lift screw 30 which is also journaled in a bearing 32 carried by the member 28. A folding handle 34 is secured to the lift screw 30 by means of a set screw 36 or other suitable means. The handle 34 is provided for rotating the lift screw 30, as may be necessary.

Threadedly secured on the lift screw 30 is an upper lift block 38 provided with a recess 40 for receiving a portion of a bumper of a vehicle. Freely slidable on the lift screw 30 is an upper guide block 42 which is adapted to overlie the bumper and cooperate with the lift block 38 to raise a portion of a vehicle. Hence, upon rotation of the handle 34, the upper lift block 38 will be raised or lowered, as may be desired.

There is also slidably received on the lift screw 30 a lower lift block 44 which has pivotally attached thereto a pair of spaced links 46 and 48. Pivotally attached to the other ends of the links 46 and 48 are rollers 50 and 52 which engage the cam surface 24 on the base 12. By means of the pins 54 and 56 utilized in rotatably mounting the rollers 52 and 50 relative to the links 46 and 48, there are another pair of links 58 and 60 mounted for relative rotation with respect to the links 46 and 48. The other ends of the links 58 and 60 are pivotally mounted by means of pins 62 to the lift member 18, the lift member 18 having downwardly depending ears 64 and 66 overlying the tubular portion 14 of the base 12. Hence, upon rotation of the handle 34, the lift screw 30 will be actuated to raise or lower the upper lift block 38 which engages the lower lift block 44 to push the lower lift block downwardly. This will cause the rollers 50 and 52 to ride along the cam surface 24 and cause the linkage to raise or lower the lift member 18, as desired. An overhanging portion 68 is provided to prevent the links 58 and 60 from kicking up or otherwise functioning improperly.

There is also secured to the ears 64 and 66 downwardly depending side members 70 and 72 which carry a lift toe 74 having a toothed upper face 76 for engaging a suitable body to be lifted. The lift toe 74 will, of course, be raised in accordance with the movement of the lift member 18.

Attached to the base 12, there is also provided a first latch member 78 having an upwardly extending detent portion 80 adapted to lockingly engage with a detent portion 82 of a second latch member 84 pivotally mounted on the member 28. Utilizing the latch members 78 and 84, the elongated member 28 and hence the lift screw 30 can be lockingly held in a substantially vertical position for ready utilization of the bumper engaging lift block 38.

Since from the foregoing, the construction and advantages of this combination auto jack are readily apparent, further description is believed to be unnecessary.

However, since numerous modifications will readily occur to those skilled in the art after a consideration of the foregoing specification and accompanying drawings, it is not intended to limit the invention to the precise embodiments shown and described, but all suitable modifications and equivalents may be readily resorted to.

What is claimed as new is as follows:

1. An auto jack comprising a base, an axle engaging lift member mounted on said base for vertical movement relative thereto, a cam surface on said base, an elongated member pivotally attached to said base, a lift screw journaled in said elongated member, a lift block slidably mounted on said screw, means on said screw engageable with said lift block to move said lift block upon selective rotation of said screw, and a linkage interconnecting said lift block with said lift member, said linkage being pivotally attached to said lift block and said lift member, said linkage including a roller engaging said cam surface.

2. An auto jack comprising a base, an axle engaging lift member mounted on said base for vertical movement relative thereto, a cam surface on said base, an elongated member pivotally attached to said base, a lift screw journaled in said elongated member, a lift block slidably mounted on said screw, means on said screw engageable with said lift block to move said lift block upon selective rotation of said screw, and a linkage interconnecting said lift block with said lift member, said linkage being pivotally attached to said lift block and said lift member, said linkage including a roller engaging said cam surface, a lifting toe, and means pivotally connecting said lifting toe to said lift member.

References Cited in the file of this patent

UNITED STATES PATENTS

| | | |
|---|---|---|
| 202,197 | Sherman | Apr. 9, 1878 |
| 1,533,737 | Jacomy | Apr. 14, 1925 |
| 1,825,702 | Newton | Oct. 6, 1931 |
| 1,970,960 | Groff | Aug. 21, 1934 |
| 2,237,230 | Johnson | Apr. 1, 1941 |
| 2,514,314 | Denton | July 4, 1950 |
| 2,590,970 | Jensen | Apr. 1, 1952 |
| 2,609,178 | Kearful et al. | Sept. 2, 1952 |
| 2,618,464 | Sintz | Nov. 18, 1952 |